US012565825B2

(12) United States Patent
Sandu et al.

(10) Patent No.: US 12,565,825 B2
(45) Date of Patent: Mar. 3, 2026

(54) SYSTEM AND METHOD FOR RESERVOIRED OIL PRODUCTION BASED ON CALCULATED COMPOSITION OF NATURAL TRACERS

(71) Applicant: ARAMCO SERVICES COMPANY, Houston, TX (US)

(72) Inventors: Constantin Sandu, Houston, TX (US); Ibrahim Atwah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1211 days.

(21) Appl. No.: 17/470,796

(22) Filed: Sep. 9, 2021

(65) Prior Publication Data

US 2022/0074291 A1      Mar. 10, 2022

Related U.S. Application Data

(60) Provisional application No. 63/075,959, filed on Sep. 9, 2020.

(51) Int. Cl.
*E21B 43/16*        (2006.01)
*E21B 47/11*        (2012.01)
            (Continued)

(52) U.S. Cl.
CPC .............. *E21B 43/16* (2013.01); *E21B 47/11* (2020.05); *G06F 30/20* (2020.01); *E21B 2200/20* (2020.05); *G06F 2113/08* (2020.01)

(58) Field of Classification Search
CPC ...... E21B 43/16; E21B 47/11; E21B 2200/20; E21B 49/00; G06F 30/20; G06F 2113/08
See application file for complete search history.

(56) References Cited

U.S. PATENT DOCUMENTS 6,101,447 A      8/2000   Poe, Jr.
7,739,089 B2     6/2010   Gurpinar et al.
            (Continued)

FOREIGN PATENT DOCUMENTS

CN           105242026 A      1/2016
WO       2018/071029 A1      4/2018
            (Continued)

OTHER PUBLICATIONS

Yang Y, Arouri K. Assessment of Oil Migration Pathway Dimension by Modelling Analysis of Geotracer Distributions. InInternational Petroleum Technology Conference Mar. 22, 2019 (p. D021S020R001). IPTC. (Year: 2019).*

(Continued)

*Primary Examiner* — Eunhee Kim
(74) *Attorney, Agent, or Firm* — Osha Bergman Watanabe & Burton LLP

(57)            ABSTRACT

A method for production prediction using tracers in an oilfield system is disclosed. The method involves reading, by a computer processor, a set of subsurface field properties characterizing a field system, generating, by the computer processor, a base field model, creating, by the computer processor, a plurality of static models of the field system, running, by the computer processor, a suite of dynamic simulations to produce a plurality of tracer compositions, creating, by the computer processor, a filling envelope function based on the plurality of tracer compositions, calculating, by the computer processor, a production prediction for a measured tracer composition based on the filling envelope function, and executing, by the computer processor, a field operation based on the production prediction, wherein the field operation results in hydrocarbon being extracted from a trap reservoir.

10 Claims, 10 Drawing Sheets

(51) Int. Cl.
  G06F 30/20 (2020.01)
  G06F 113/08 (2020.01)

(56) References Cited

U.S. PATENT DOCUMENTS

| | | | |
|---|---|---|---|
| 9,043,188 B2 | 5/2015 | Yeten et al. | |
| 9,290,689 B2 | 3/2016 | Lafitte et al. | |
| 10,767,475 B2 * | 9/2020 | Stone | E21B 49/08 |
| 2011/0030465 A1 | 2/2011 | Smalley | |
| 2014/0250999 A1 * | 9/2014 | Lawson | E21B 49/02 |
| | | | 73/152.23 |
| 2014/0288853 A1 | 9/2014 | Dreyfus et al. | |
| 2015/0081265 A1 | 3/2015 | Kauerauf et al. | |
| 2015/0130468 A1 | 5/2015 | Christian et al. | |
| 2018/0321215 A1 * | 11/2018 | Peterson | G01V 9/007 |
| 2019/0048717 A1 | 2/2019 | Lu | |
| 2019/0055842 A1 | 2/2019 | Lu | |
| 2019/0064390 A1 | 2/2019 | Baur | |
| 2019/0228121 A1 * | 7/2019 | Fung | G06F 30/20 |

FOREIGN PATENT DOCUMENTS

| | | | | |
|---|---|---|---|---|
| WO | 2018/208611 A1 | 11/2018 | | |
| WO | WO-2019232043 A1 * | 12/2019 | | E21B 43/12 |

OTHER PUBLICATIONS

Sharma A, Shook GM, Pope GA. Rapid analysis of tracers for use in EOR flood optimization. InSPE Improved Oil Recovery Conference? Apr. 12, 2014 (pp. SPE-169109). SPE. (Year: 2014).*

International Search Report and Written Opinion of the International Searching Authority issued in corresponding International Application No. PCT/US2021/049584 mailed on Dec. 22, 2021 (15 pages).

Fetkovich, M.J. et al., "Useful Concepts for Decline Curve Forecasting, Reserve Estimation, and Analysis"; SPE Reservoir Engineering; vol. 11, Issue 1, Paper No. SPE-28628-PA; pp. 13-22; Feb. 1996 (10 pages).

Jones, A. D. W. et al., "The Use of Reservoir Simulation in Deterministic Proved-Reserves Estimation"; SPE Reservoir Evaluation & Engineering; vol. 19, Issue 3, Paper No. SPE-170669-PA; pp. 358-366; Jul. 2016 (9 pages).

Rietz, Dean et al., "Case Studies Illustrating the Use of Reservoir Simulation Results in the Reserves Estimation Process"; SPE Reservoir Evaluation & Engineering; vol. 12, Issue 1, Paper No. SPE-110066-PA; pp. 149-158; Feb. 2009 (10 pages).

Yang, Yunlai et al., "Mathematical models of the distribution of geotracers during oil migration and accumulation"; Petroleum Geoscience; vol. 11, No. 1; pp. 67-78; Jan. 2005 (12 pages).

Yang, Yunlai et al., "A Simple Geotracer Compositional Correlation Analysis Reveals Oil Charge and Migration Pathways"; Scientific Reports; vol. 6, Article No. 23066; pp. 1-13; Mar. 11, 2016 (13 pages).

Hutahaean, Junko, "Use of Natural Tracer Data in Well Placement Optimization"; Proceedings of the SPE Annual Technical Conference and Exhibition; Paper No. SPE-173462-STU; pp. 1-13; Oct. 27-29, 2014 (13 pages).

Huseby, Olaf et al., "Natural and Conventional Tracers for Improving Reservoir Models Using the EnKF Approach"; SPE Journal; vol. 15, Issue 4, Paper No. SPE-121190-PA; pp. 1047-1061; Dec. 2010 (15 pages).

* cited by examiner

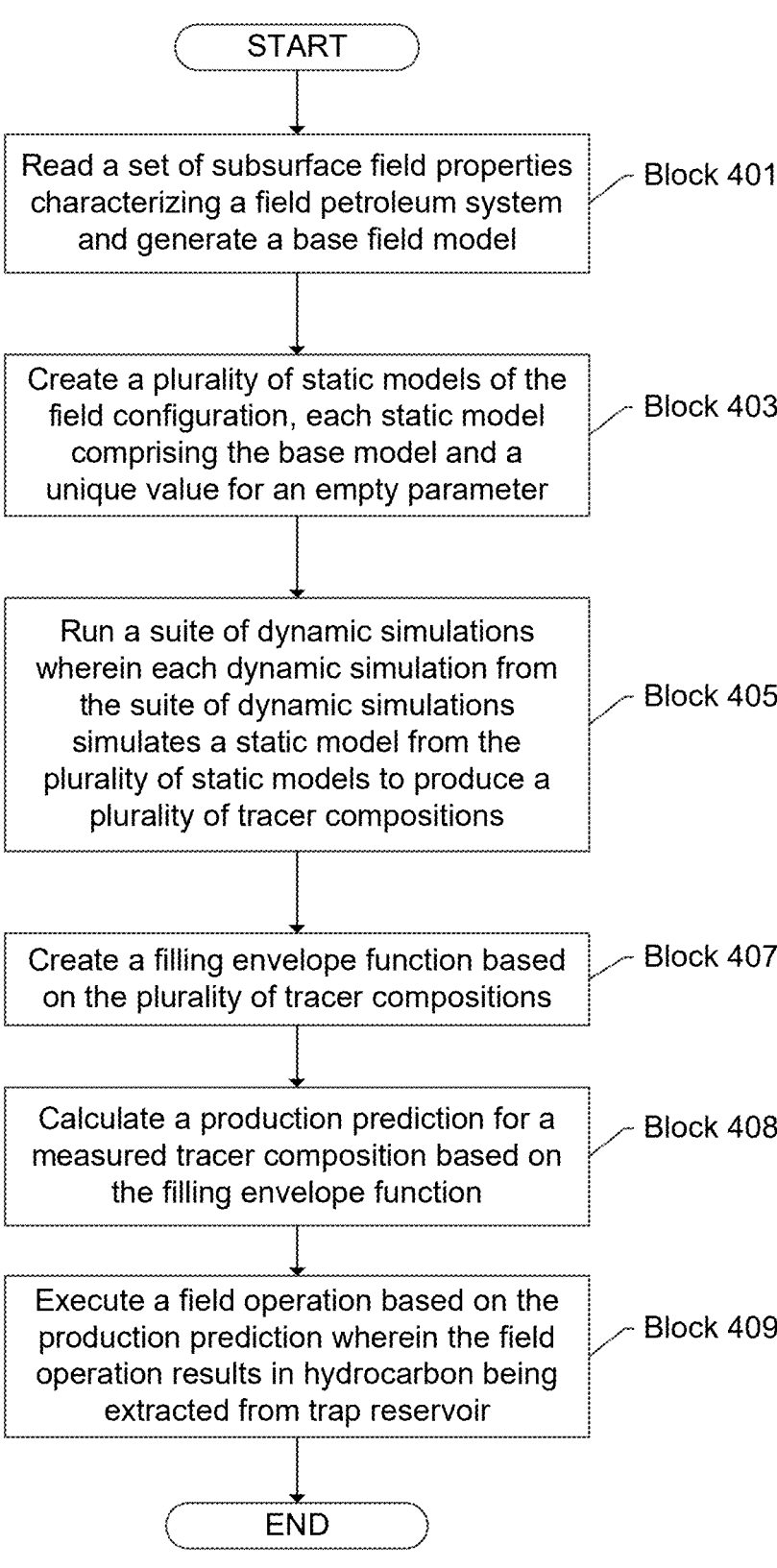

START

Read a set of subsurface field properties characterizing a field petroleum system and generate a base field model — Block 401

Create a plurality of static models of the field configuration, each static model comprising the base model and a unique value for an empty parameter — Block 403

Run a suite of dynamic simulations wherein each dynamic simulation from the suite of dynamic simulations simulates a static model from the plurality of static models to produce a plurality of tracer compositions — Block 405

Create a filling envelope function based on the plurality of tracer compositions — Block 407

Calculate a production prediction for a measured tracer composition based on the filling envelope function — Block 408

Execute a field operation based on the production prediction wherein the field operation results in hydrocarbon being extracted from trap reservoir — Block 409

END

*FIG. 4*

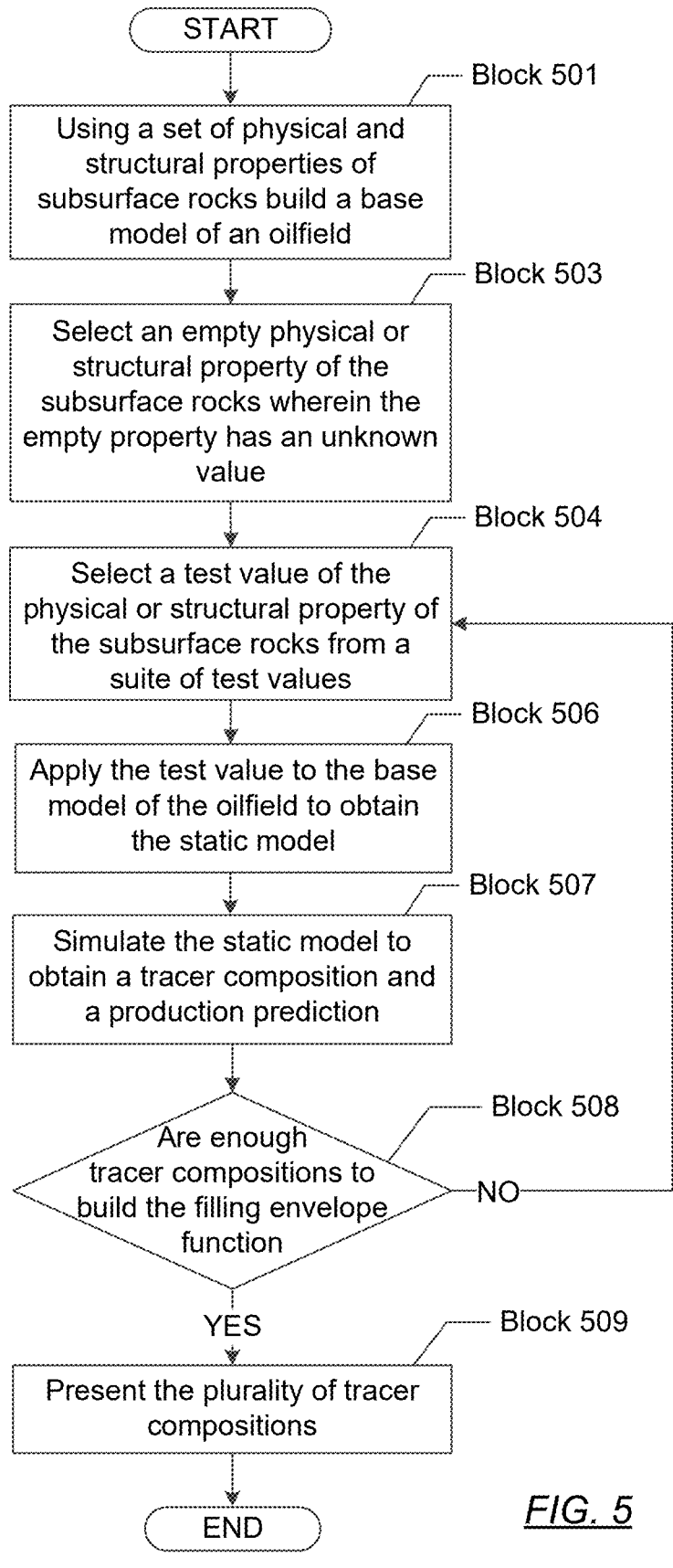

START

Block 501

Using a set of physical and structural properties of subsurface rocks build a base model of an oilfield Block 503

Select an empty physical or structural property of the subsurface rocks wherein the empty property has an unknown value Block 504

Select a test value of the physical or structural property of the subsurface rocks from a suite of test values Block 506

Apply the test value to the base model of the oilfield to obtain the static model Block 507

Simulate the static model to obtain a tracer composition and a production prediction Block 508

Are enough tracer compositions to build the filling envelope function

NO

YES

Block 509

Present the plurality of tracer compositions

END

*FIG. 5*

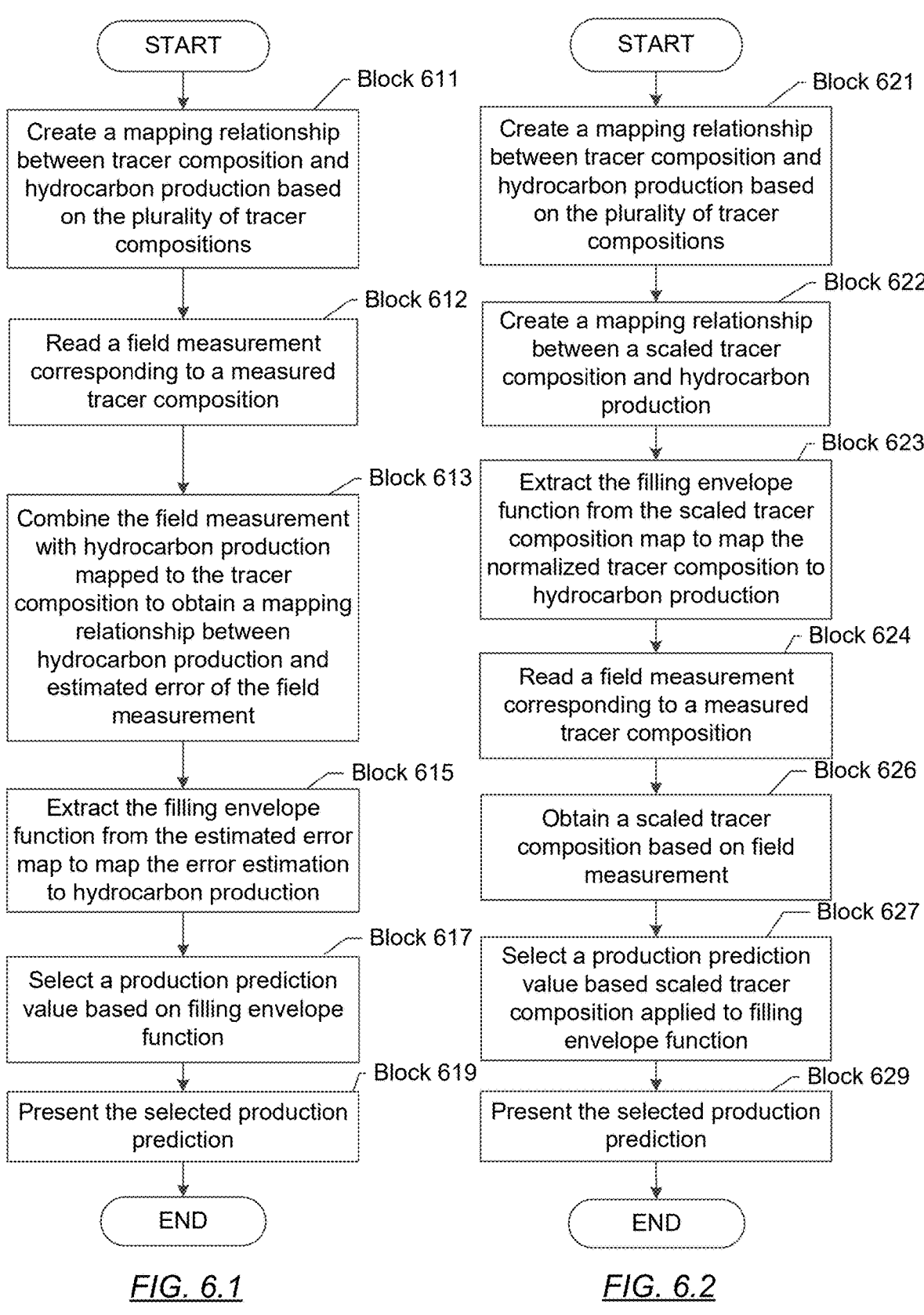
*FIG. 6.1*                    *FIG. 6.2*

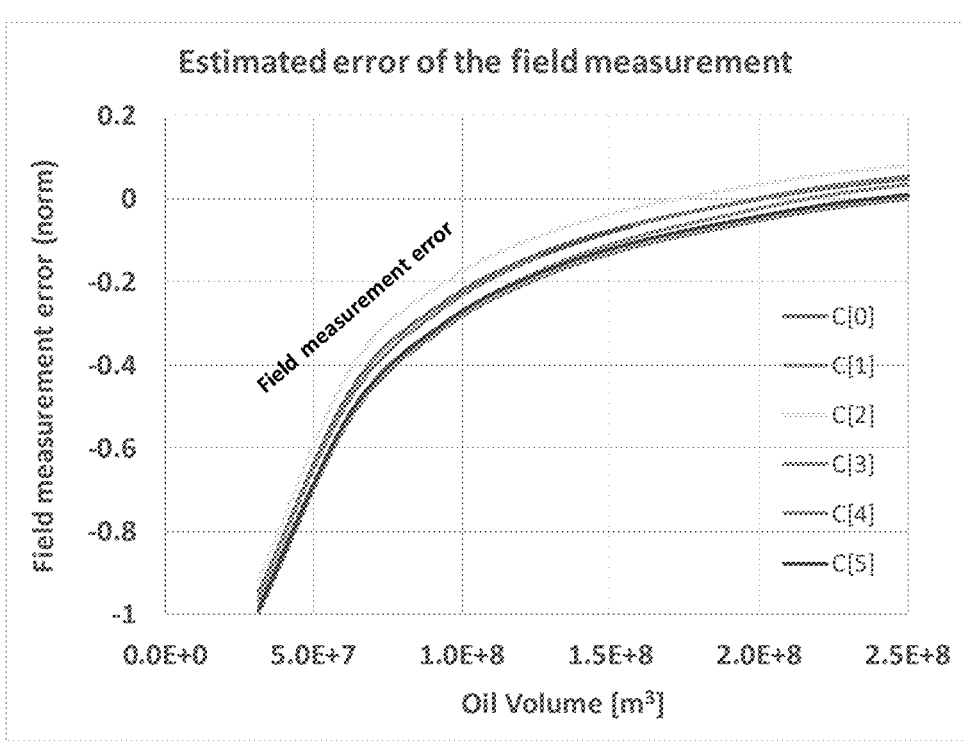
*FIG. 8.1*
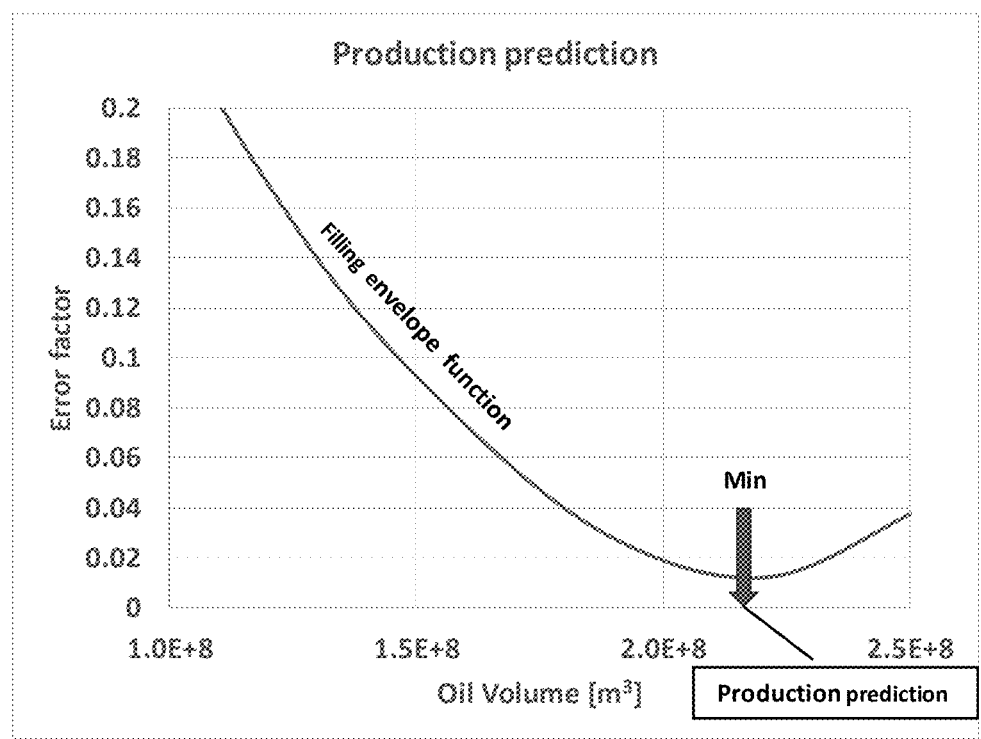
*FIG. 8.2*

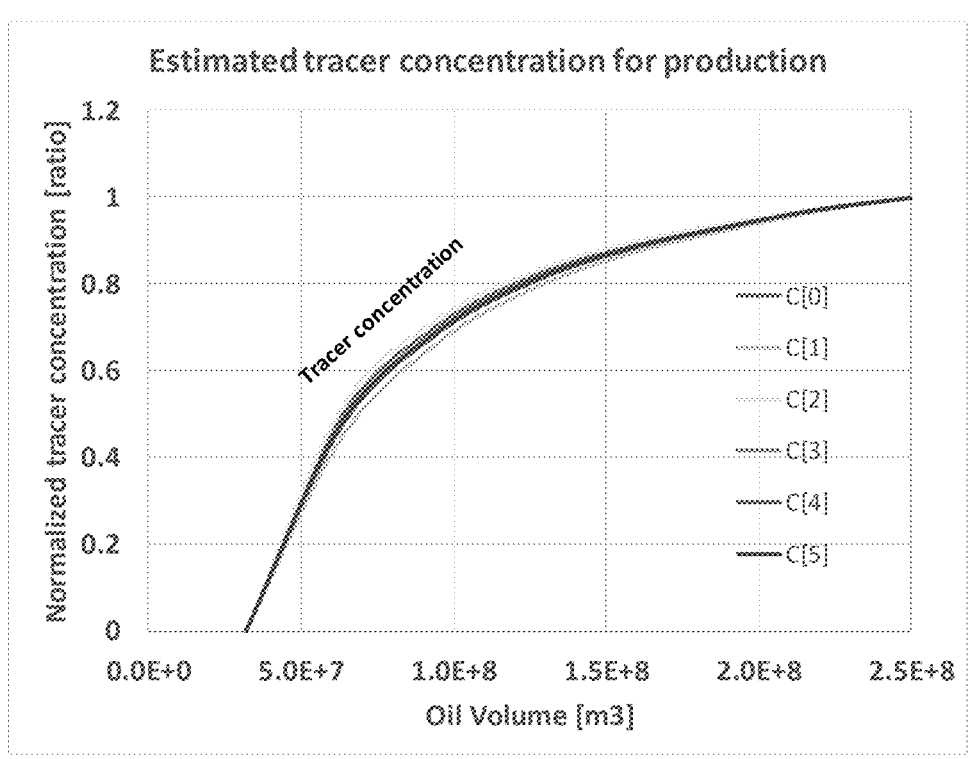
FIG. 9.1
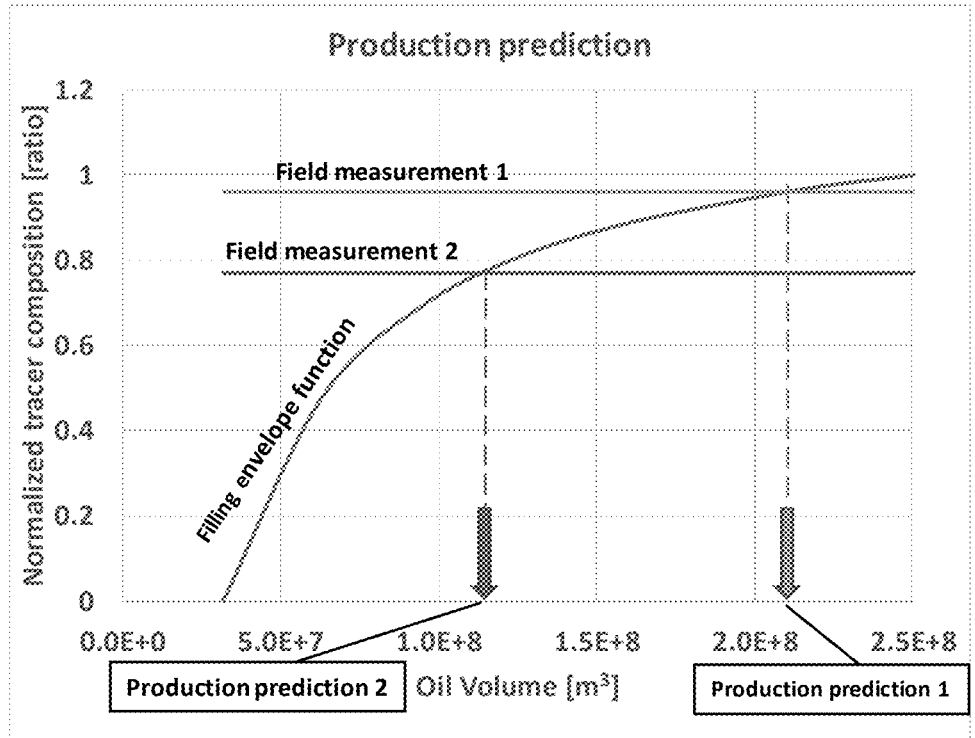
FIG. 9.2

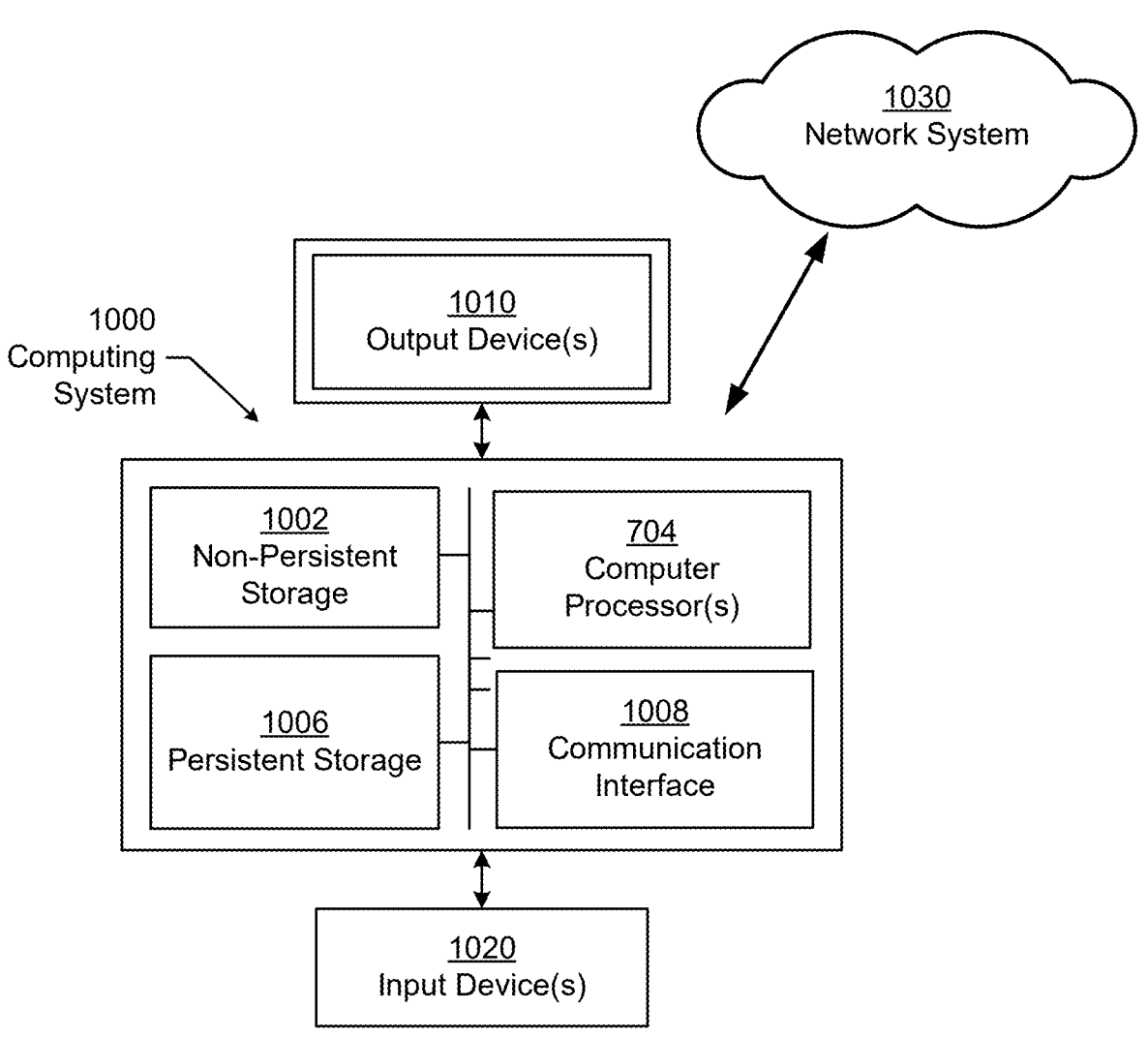
<u>FIG. 10</u>

SYSTEM AND METHOD FOR RESERVOIRED OIL PRODUCTION BASED ON CALCULATED COMPOSITION OF NATURAL TRACERS

BACKGROUND

The decision to drill a well to extract oil from a reservoir involves designing and calibrating a set of tools and instruments to scale with the expected oil production. For example, the artificial lift systems, the field storage facilities, the pipeline dimensions, and other field equipment designs are affected by the expected oil production quantity. Typically, production estimation methods are based on indirect measurements, or computer simulations of the oil generation, migration, and accumulation from the source rock to the trap reservoir. However, many parameters that define the model simulations are not constrained by physical measurements, so the results coming from the simulations are introducing a source of errors in designing the equipment for oil production, thereby reducing the efficiency of oil extraction.

To reduce the error margin of model simulations, model parameters are continuously updated with new production data once the oil production of the reservoir begins. The aim is to predict future extraction amounts in a reliable manner. Other methods combine field measurements with statistic modeling to obtain ranges of production with each range having assigned a risk estimate. However, a need exists to confirm the estimates before the production starts using direct measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, the invention relates to a method for production prediction using tracers in an oilfield system comprising reading, by a computer processor, a set of subsurface field properties characterizing a field system, generating, by the computer processor, a base field model, creating, by the computer processor, a plurality of static models of the field system, running, by the computer processor, a suite of dynamic simulations to produce a plurality of tracer compositions, creating, by the computer processor, a filling envelope function based on the plurality of tracer compositions, calculating, by the computer processor, a production prediction for a measured tracer composition based on the filling envelope function, and executing, by the computer processor, a field operation based on the production prediction, wherein the field operation results in hydrocarbon being extracted from a trap reservoir.

In general, in one aspect, the invention relates to a field system for predicting oil production, comprising a plurality of tracers trapped in a trap reservoir in a subsurface formation of the field system, an exploration and production computer system comprising a processor configured to run a suite of dynamic simulations to produce a plurality of tracer compositions of the plurality of tracers using a base field model that is based on a set of subsurface field properties characterizing the field system, and a plurality of static models comprising the base model and a unique value for an empty parameter, wherein the empty parameter has an unknown value, and a surface unit configured to control operations of the field system and send data received from the exploration and production computer system to field operation equipment configured to perform a field operation that results in hydrocarbon being extracted from the trap reservoir.

In general, in one aspect, the invention relates to a non-transitory readable medium comprising program instructions that when executed, are configured to perform a method for production prediction comprising reading a set of subsurface field properties characterizing a field system, generating a base field model of the field system, creating a plurality of static models of the field system, running a suite of dynamic simulations to produce a plurality of tracer compositions, creating a filling envelope function based on the plurality of tracer compositions, and calculating a production prediction for a measured tracer composition based on the filling envelope function, wherein a field operation is executed in the field system based on the production prediction, and wherein the field operation results in hydrocarbon being extracted from a trap reservoir in a subsurface of the field system.

Other aspects and advantages of the claimed subject matter will be apparent from the following description and the appended claims.

BRIEF DESCRIPTION OF DRAWINGS

FIG. 4 shows a flowchart in accordance with one or more embodiments disclosed herein.

FIG. 5 shows a flowchart in accordance with one or more embodiments disclosed herein.

FIGS. 6.1 and 6.2 show flowcharts in accordance with one or more embodiments disclosed herein.

FIG. 8.1 shows a graph of the estimated error of the field measurement in accordance with one or more embodiments disclosed herein.

FIG. 8.2 shows a graph of the production prediction in accordance with one or more embodiments disclosed herein.

FIG. 9.1 shows a graph of the estimated tracer concentration for production in accordance with one or more embodiments disclosed herein.

FIG. 9.2 shows a production prediction graph in accordance with one or more embodiments disclosed herein.

FIG. 10 shows a computer system in accordance with one or more embodiments disclosed herein.

DETAILED DESCRIPTION

In general, embodiments disclosed herein relate to a method and system to extract oil from the subsurface by at least predicting the production of hydrocarbons accumulated in a trap reservoir based on the composition of a set of natural tracers. The prediction is further used to design the field equipment to execute the oil extraction operations accordingly. A computerized analysis system is also disclosed for detecting the relative amounts of a set of tracer compounds in a hydrocarbon-bearing formation to determine the amount of hydrocarbons in the formation.

During oil generation from the source rock, a set of natural tracers is also generated. These tracers migrate along with oil to accumulate in the same trap reservoir as the oil. The tracers consist of hydrocarbon components produced in small quantity compared to the associated oil, with each hydrocarbon component having a production rate. Tracers have the property to interact with the subsurface environment after they are generated. The interaction continues along the migration pathway through a migration channel and into the trap reservoir resulting in each tracer having an altered concentration from a value inherited right after generation. Each tracer interacts with the subsurface environment with different intensity, the interaction resulting in different tracer concentrations being present in the trap reservoir. In other words, as the tracers are generated along with oil and carried by oil into the trap reservoir, the specific tracer composition present in the trap reservoir correlates with the amount of oil accumulated in the trap reservoir. Further, it is possible to predict oil production from the trap reservoir based on the mixture of traces present in the trap reservoir and based on reservoir trap properties measured from the surface before the oil production is initiated. Based on the predicted oil production, a set of oilfield operations may be designed for oil to be produced from the trap reservoir. One or more embodiments disclosed herein applies to multiple oilfield operations, for example, operations presented in FIG. 1.

Figure 1:
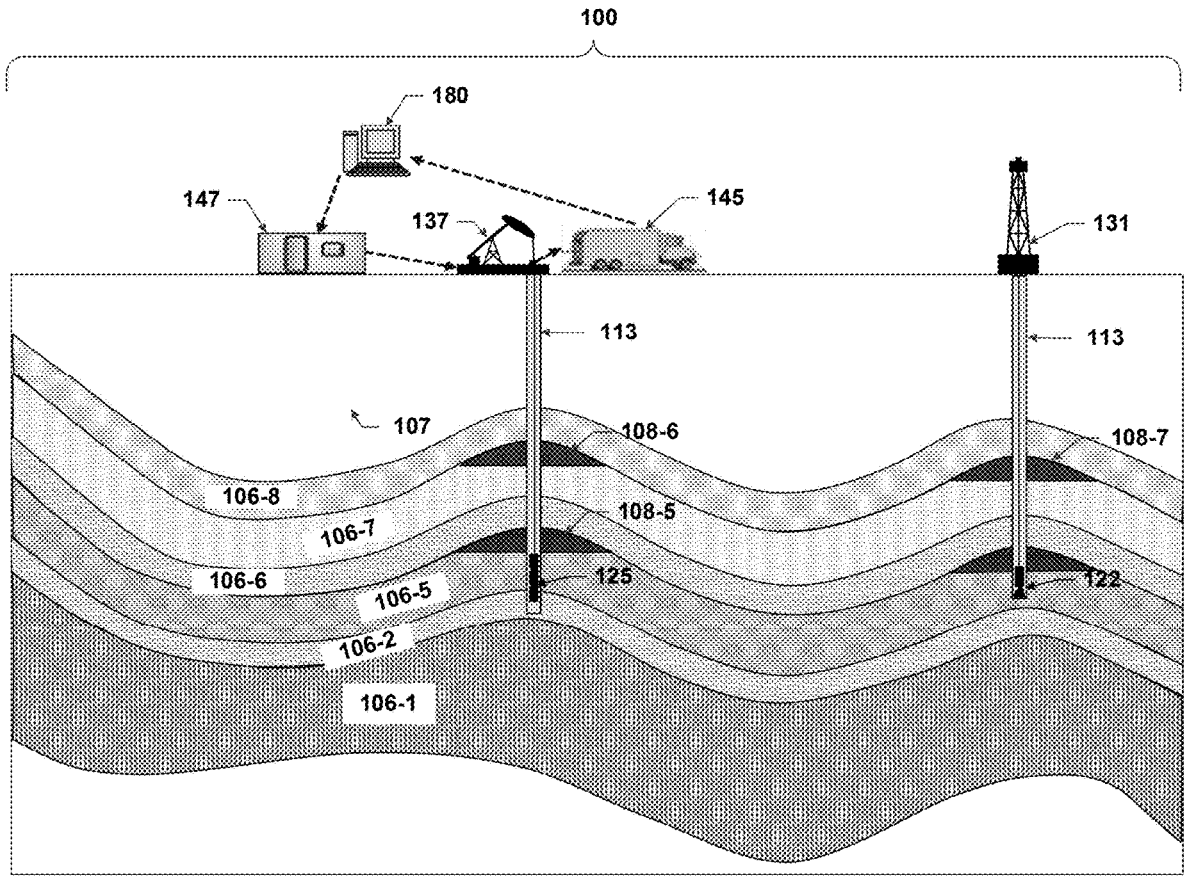
FIG. 1 shows a field system in accordance with one or more embodiments disclosed herein.

FIG. 1 shows a field system (100) in accordance with one or more embodiments disclosed herein. More specifically. FIG. 1 shows an exemplary field (100) in accordance with one or more embodiments. FIG. 1 is a schematic view, partially in cross-section, of a field (100) in which the system and method for reservoired oil production based on calculated composition of natural tracers may be implemented. In general, field systems and well sites may be configured in a myriad of ways. Therefore, FIG. 1 is not intended to be limiting with respect to the particular configuration of the drilling equipment. The field system (100) of FIG. 1 may communicate with a well site that may be on land or offshore, and drilling may be carried out with or without use of a marine riser. Field system (100) may control at least a portion of a drilling operation at the well site by providing controls to various components of the drilling operation.

A drilling operation in a field system (100) at well site may include drilling a wellbore, such as 113 into a geologic sedimentary basin including various subterranean formations. As shown in FIG. 1, the subterranean formations (106) may include several geological structures (106-1, 106-2, 106-5, 106-6, 106-7, 106-8). As shown, the formation may include a shale layer (106-2), a limestone layer (106-5), a sandstone layer (106-7), and another shale layer (106-6). A fault line (not shown) may be present in the subsurface formations. In particular, the geologic sedimentary basin includes rock formations and at least one reservoir including fluids. Although FIG. 1 shows a field (100) on the land, the field (100) may be an offshore field. In such a scenario, the subterranean formation (106) may be in the sea floor. Further, field data may be gathered from the field system (100) that is an offshore field using a variety of offshore techniques for gathering field data known to those of ordinary skill in the art. Wellbores (113) are used in drilling and production processes and may include drill strings with drill bits (122) and other bottom hole assembly (BHA) components at the end. Wellbores (113) may be suspended into the ground by derricks (131).

In addition, the field system (100) may include a seismographic system (not shown) that sends shock waves down into the subsurface, and based on the type of formation (106), receives different signals back for determining seismographic data. The seismographic system may include a plurality of sensors for receiving the signals and generating images showing seismographic data.

In FIG. 1, the oil along with the tracers are generated within the source rock 106-2 and migrate through a reservoir formation (106-5) to accumulate in trap reservoir (108-5 and 108-6). Such migration may occur through a migration channel (shown in FIG. 2 below). FIG. 1 shows several trap reservoirs (108-5, 108-6, 108-7). A trap reservoir is an underground rock volume surrounded by sealing formations that blocks the movement of oil and causes it to accumulate in a reservoir formation that can be exploited. Trap reservoirs (108-5, 108-6, 108-7) are created when a trapping mechanism is present and creates a place to contain the accumulated hydrocarbons.

A field acquisition system (145) may collect information about the tracer composition of oil in the trap reservoir (108-5, 108-6) and send this information for processing to a computer system (180). Tracer data obtained from the field acquisition system (145) may be used to generate images and determine the composition, quantity, and other properties of the tracers. In one or more embodiments, the natural tracers (not shown) refer to a set of chemical compounds that are generated in nature from a source rock simultaneous with oil and other hydrocarbons. For example, products of carbazole family are a type of nitrogen-based compounds that may be used as tracers. The natural tracers migrate in the trap reservoir along with oil, but their absolute and relative composition changes as the reservoir trap is filled with oil.

The computer system (180) may include a processor and memory (as shown in FIG. 10 below) and may be any type of computing device capable of processing the composition information and determining the volume of oil in accumulation. The production estimate may be the volume of oil present in the reservoir trap. The information processed by the computer system (180) is further passed to production equipment (137) by the surface unit (147) for extraction of oil in trap reservoir (108-5, 108-6). Production equipment may also be referred to as field operation equipment (137) and is the equipment necessary to perform field operations based on the production predictions. As shown in FIG. 1, the production equipment (137) may include a pump jack and corresponding pneumatic piston (125) for pumping the oil from the trap reservoir to the surface. The production equipment (137) may additionally include equipment for power generation, hoisting equipment, rotating equipment, blowout preventers, or any other suitable equipment that may be used to bring the oil to the surface. Oil pumped from the subsurface may be stored in crude oil tanks. The field system (100) and data acquired via the system is controlled by the surface equipment (147), which may include a satellite and control unit as shown in FIG. 1. The surface equipment (147) acts as a hub for collecting and processing data from the field system (100). Surface unit (147) may also include functionality to separate oil, gas, and water, and test production capabilities of the system (100). Surface unit (147) may be configured to generate a graph (plot) of the production volume versus downhole pressure as the production equipment (137) operates to bring oil to the surface.

Communication between the field acquisition system (145), computer system (180) and surface unit (147) may occur via satellite and data links, for example. Data links may be wired or wireless communication links between the components (145, 147, and 180). For example, the data/ graphs generated by the various parts of the field system (100) may be sent to computer system (180) for creating simulations and models to predict production from the hydrocarbons in the trap reservoirs.

The computer system of FIG. 1 (180) may more specifically be called an exploration and production computer system (180) and is used to run simulations of the subsurface formations, oil production and extraction. In one or more embodiments, the surface unit (147) is configured to receive field data from the exploration and production computer system (180) via data links as described above. Details of the exploration and production computer system (180) are described in FIG. 3 below.

The computer simulations run on the exploration and production computer system (180), for example basin model simulations, are unable to predict the volume (production) of oil accumulated in the trap reservoir (102) if one or more parameters of the oil system have large uncertainty. At the same time, field measurements are unable to detect the size of the production in the trap reservoir (102), but small samples or data collected from the accumulation can reveal the tracer composition. Accordingly, embodiments disclosed herein create an envelope function specific to an oil field system that provides all ranges of potential production given the range of the uncertainty for the field parameter investigated. In other words, the envelope function fills in all of the possible values for an empty parameter. The interrogation of the envelope function for the value of measured composition can reveal the production size. In order to generate the envelope function, a set of simulations are run on a numeric model that represents the field system.

In one or more embodiments, for each simulation, a suite of values of an uncertain parameter is selected in random or predefined order. For example, the properties of source rock may represent a source of uncertainty, like the expulsion efficiency, organic richness or source volume. In other instances, the trap reservoir parameters may be uncertain, for example, the volume capacity. If the volume capacity is limited, the oil may spill to the next trap reservoir bypassing the first one. Because the tracers generated are affected differently by the oil field system configuration, their concentration obtained in the trap reservoir will vary with the changes in field system configuration as a result of selecting a different value for the uncertain/empty parameter. The numeric simulation quantifies the effect of the environment on each tracer and keeps track of its concentration in the oil of the trap reservoir.

Figure 2:
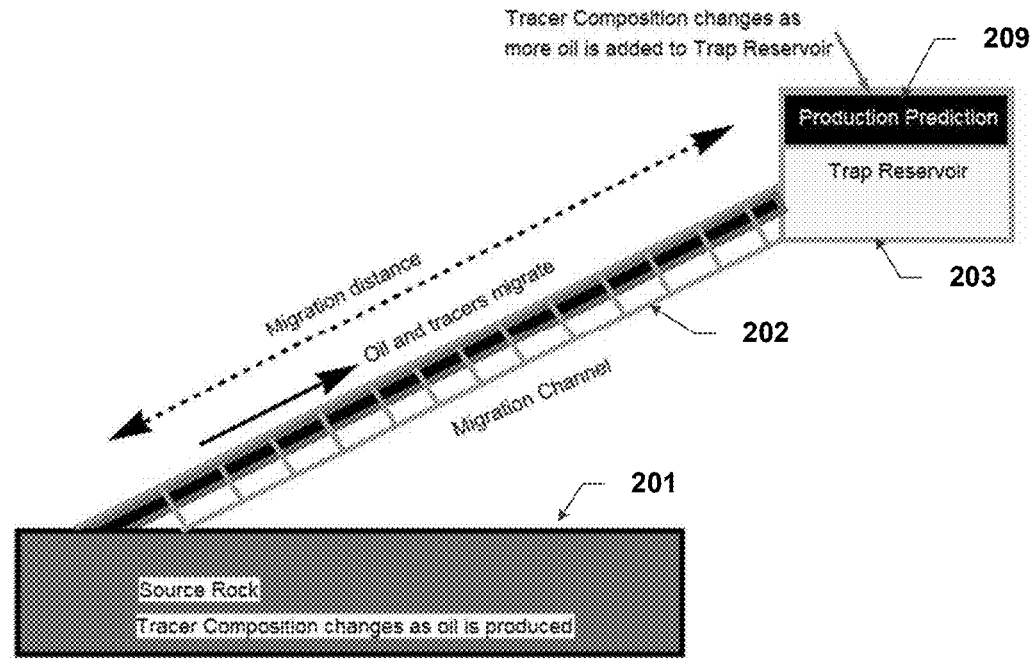
FIG. 2 shows an example flow diagram in accordance with one or more embodiments disclosed herein.

FIG. 2 shows an example flow diagram of the overall concept of the embodiments disclosed herein. In FIG. 2, oil and natural tracers migrate from source rock (201) via migration channel (202) to the trap reservoir (203) over a migration distance shown with arrows. The tracer composition changes as oil is produced, and also as more oil is added to the trap reservoir once the oil and tracers have migrated to such a reservoir and can no longer travel further in the subsurface formation. In one or more embodiments, the tracer composition and concentrations in the trap reservoir (203) are used for production prediction (209) using the methods described below in FIGS. 4-9.2. For example, the production prediction may be derived by applying one embodiment of the method described below in FIG. 4.

Figure 3:
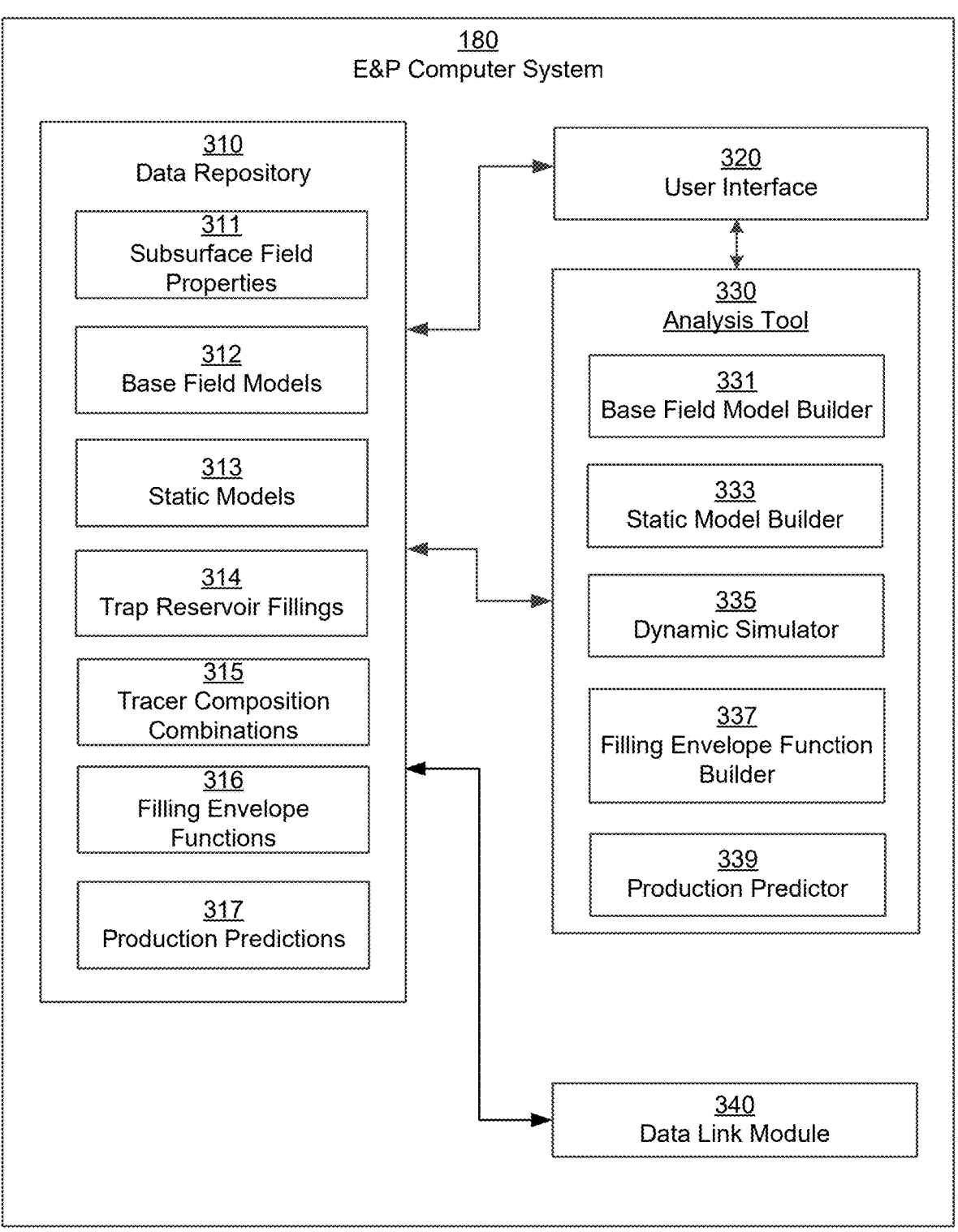
FIG. 3 shows an exploration and production computer system in accordance with one or more embodiments disclosed herein.

FIG. 3 shows an expanded diagram of the exploration and production computer system 180 of FIG. 2, in which one or more embodiments of system and method for reservoired oil production based on calculated composition of natural tracers may be implemented. As shown in FIG. 3, the exploration and production computer system (180) includes an analysis tool (330), a data repository (310) for storing input data, intermediate data, and resultant outputs of the analysis tool (330), a user interface (320), and a data link module (340) for receiving field measurements and transmitting instructions to field equipment such as the surface unit (147). Although not shown, the computer system (180) may include one or more processors, memory for storing the data repository (310), and a display for displaying the user interface (320).

The data repository (310) may be any data structure stored in the memory of the computer system (180). For example, the data repository may be a database including tables, lists, arrays, or any suitable data structure for storing content/data. A database is a collection of information configured for case of data retrieval, modification, re-organization, and deletion. In one or more embodiments, the content stored in the data repository (310) includes subsurface field properties (311), base field models (312), static models (313), trap reservoir fillings (314), tracer composition combinations (315), filing envelope functions (316) and production predictions (317). Subsurface field properties (311) may describe characteristics of the subsurface formation including, for example, porosity, permeability, thermal conductivity and organic content of the formation. Base field models and static models (312, 313) may include various models of the fluid flow of the reservoir. Specifically, base filed models (312) may be assembled from structural information of the fields such as the geometry of the subsurface layers. Static models (313) may be an enhancement or augmentation of the base field models for specific parameters or characteristics and may be based on a statistical distribution function such as gaussian, peak, logarithmic or any other suitable mathematical function. Trap reservoir fillings (314) may describe the amount or characteristics of oil and hydrocarbons in the trap reservoir.

Tracer composition combinations (315) may describe the different naturally occurring chemicals or mixtures that form the tracers, and the various combinations of chemicals or materials that may be in each tracer composition. Because each tracer interacts with the subsurface environment with different intensity, different tracer concentrations may be present in the trap reservoir. Filling envelope functions are a type of mathematical functions that relates a parameter derived from the composition of various tracers in hydrocarbon (thus enveloping the concentration of multiple components) to the potential volume of hydrocarbon accumulated in a trap reservoir. The potential volume of hydrocarbon, or in other words the filling level of the trap reservoir, is a measure of the production prediction. For example, the total concentration of a set of tracers in accumulation may increase proportionally with the volume accumulated as the set of tracers are generated at the same rate as the hydrocarbons. In this case, a function that relates the hydrocarbon volume to the set of tracers concentration is a filling envelope function since we can use the concentration to determine the filing level of the trap reservoir. Lastly, production predictions (317) may store the predictions made by the simulations/software based on the amount of hydrocarbons in the trap reservoir. Such predictions may be future extraction amounts, for example.

In one or more embodiments, the analysis tool (330) includes functionality to build the models stored in the data repository (310). Thus, the analysis tool (330) may include a base field model builder (331), a static model builder (333), a dynamic simulator (335) for simulating trap reservoir fillings and tracer composition combinations, a filing envelope function builder (337) and the production predictor (339) for predicting the amount of oil production based on the tracers in the trap reservoir fillings (314). Each of these components of the analysis tool (330) may include functionality to generate mathematical models, graphs, simulations, using any suitable algorithms for hydrocarbons composition and quantity analysis and oil composition analysis to aid in obtaining production predictions (317) of oil production. One such algorithm is the filling envelope function algorithm.

In one or more embodiments, the result generated by the exploration and production computer system (180) may be displayed to a user using the user interface (320), or other suitable interfaces. The user interface (320) may be a graphical user interface, in one or more embodiments. The user interface may be displayed on a display of any suitable type, and may be used to observe or run model simulations by the user of the computer system (180). For example, the production predictions (317) may be used by the user to predict hydrocarbon content throughout portions of the field system (100) and to facilitate drilling, fracturing, or other exploratory and/or production operations of the field system (100).

FIG. 4 shows a flowchart to interrogate an envelope function for the value of measured compositions of natural tracers to calculate a production prediction for extracting hydrocarbon from trap reservoir, in accordance with one more embodiments disclosed herein. One or more blocks in FIG. 4 may be performed by a computing system, such as the exploration and production computer system (180) shown in FIGS. 1 and 2, including a computer processor and communication interface. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 401, a set of subsurface field properties characterizing a field system (100) is read from the data repository (310) and a base field model is generated. For example, a base field model may be assembled from structural information of the fields such as the geometry of the subsurface layers (106). In one or more embodiments, the subsurface layers may be assigned physical properties such as porosity, permeability, thermal conductivity and organic content. Further, the subsurface layers may be assigned timeline properties such as age of deposition.

In Block 403, a plurality of static models of the field configuration are created, each static model comprising the base model and a unique value for an empty parameter. In one or more embodiments, a static model may be assembled by augmenting the base field model with a variable property designated as empty variable and assigning a set of values to the empty property to create a set of static models with all variables having a value assigned. For example, a field model may be augmented with source rock efficiency, oil migration distance or trap volume as empty variable and filled with a set of random values to obtain a plurality of static models. In one or more embodiments, the suite of random values may be preconditioned by a mathematical law. For example, the set of values may be required to fit a specific statistic distribution function such as gaussian, peak, logarithmic or any other suitable mathematical function.

In Block 405, a suite of dynamic simulations is run for each static model from the plurality of static models to produce a plurality of tracer compositions. In one or more embodiments, the dynamic simulations calculate the generation, migration and accumulation of oil and tracers through the subsurface layers to create a specific tracer composition for each simulation at the location of trap reservoir 102. As tracer composition accumulated in trap reservoir is different for each empty parameter value, the suite of simulations produces a plurality of tracer compositions.

In Block 407, a filling envelope function is created based on the plurality of tracer compositions. In one or more embodiments, the filling envelope function is built by combining a set of tracer compositions functions, where each function represents the concentration of a tracer from a plurality of tracers. In particular, in one or more embodiments, an envelope generation algorithm convolves the concentration relationship with the field measurement and creates a single function that maps a predictor index to the volumes of oil accumulated. For example, a filling envelope function may be created by averaging the composition of all tracers from the plurality of tracers or by applying a mathematical function to the plurality of tracers concentration or to the plurality of tracer compositions.

In Block 408, a production prediction for a measured tracer composition based on the filling envelope function is calculated. In one or more embodiments, the production prediction can be obtained from the envelope function by mapping a point on the filling envelope function to the corresponding production prediction value. For example, the filling envelope function may present the relationship between the tracer composition values and the expected predicted production value.

In Block 409, a field operation is executed based on the production prediction. In one or more embodiments, the field operation results in hydrocarbon being extracted from trap reservoir. In one or more embodiments, the field operation may be initiated by the exploration and production computer system (180) based on the specific value of the predicted production. For example, an extraction pump may be specifically dimensioned to extract the oil based on the predicted production.

FIG. 5 shows a flowchart for obtaining a plurality of tracer compositions in accordance with one or more embodiments, expanding on Block 405 in FIG. 4. One or more blocks in FIG. 5 may be performed by a computing system, such as the exploration and production computer system (180) shown in FIGS. 1 and 2, including a computer processor and communication interface. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 501, a base model of an oilfield is built using a set of physical and structural properties of subsurface rocks. In Block 503, an empty physical or structural property of the subsurface rocks is selected, where the empty property has an unknown value. In Block 504, a test value of the physical or structural property of the subsurface rocks is selected from a suite of test values. In Block 506, the test value is applied to the base model of the oilfield to obtain the static model.

In Block 507, the static model is simulated to obtain a tracer composition and a production prediction. In Block 508, a test is applied to check whether enough tracer compositions are available to build the filling envelope function. If there are not enough compositions, the process loops back to Block 504. When enough compositions exist to build the filling envelope function, then, in Block 509, the plurality of tracer compositions is presented.

FIG. 6.1 shows a flowchart to obtain a production prediction from the plurality of tracer compositions in accordance with one or more embodiments. One or more blocks in FIG. 6.1 may be performed by a computing system, such as the exploration and production computer system (180) shown in FIGS. 1 and 3, including a computer processor and communication interface. While the various blocks in FIG. 6.1 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 611, a mapping relationship is created between tracer composition and hydrocarbon production based on the plurality of tracer compositions. In Block 612, a field measurement is read corresponding to a measured tracer composition. In Block 613, the field measurement is combined with hydrocarbon production mapped to the tracer composition to obtain a mapping relationship between hydrocarbon production and estimated error of the field measurement.

In Block 615, the filling envelope function is extracted from the estimated error map to map the error estimation to hydrocarbon production. In Block 617, a production prediction value is extracted based on filling envelope function. Finally, in Block 619, the selected production prediction is presented.

FIG. 6.2 shows a flowchart to obtain a production prediction from the plurality of tracer compositions in accordance with one or more embodiments. One or more blocks in FIG. 6.2 may be performed by a computing system, such as the exploration and production computer system (180) shown in FIGS. 1 and 3, including a computer processor and communication interface. While the various blocks in FIG. 6.2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 621, a mapping relationship is created between tracer composition and hydrocarbon production based on the plurality of tracer compositions. In Block 622, a mapping relationship is created between a scaled tracer composition and hydrocarbon production. In Block 623, the filling envelope function is extracted from the scaled tracer composition map to map the normalized tracer composition to hydrocarbon production.

In Block 624, a field measurement is read corresponding to a measured tracer composition. In Block 626, a scaled tracer composition is obtained based on field measurement. In Block 627, a production prediction value is selected based scaled tracer composition applied to filling envelope function. In Block 629, the selected production prediction is presented.

Figure 7:
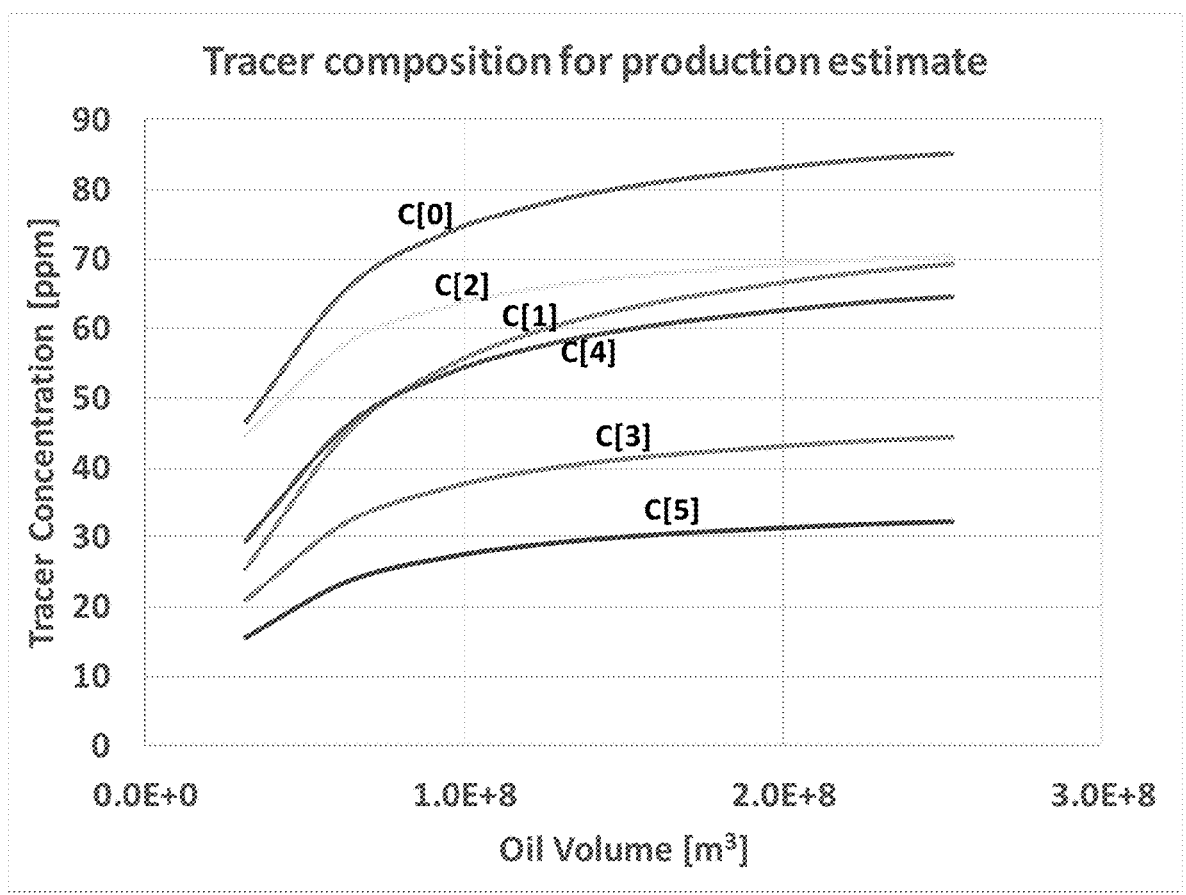
FIG. 7 shows a graph for tracer composition production estimation in accordance with one or more embodiments disclosed herein.

FIG. 7 shows an example of mapping relationships between a set of tracer compositions and hydrocarbon production as presented in Block 611 and Block 612 of FIG. 6.1 above. The tracer composition resulting from a set of static model simulations are combined to generate a suite of tracer concentration functions of the hydrocarbon production. Each function presented corresponds to a tracer from a selection of tracers (C[0]-C[5]). As presented in FIG. 7, each value of hydrocarbon production (ppm) corresponds to a combination of tracer concentration resulting in a specified composition of tracers.

In FIG. 7 for example, the result of a set of simulations with different expulsion capacity of the source rock reveals, for a set of six tracers C[0]-C[5], their concentration correlated with the final oil volume ($m^3$) accumulated in the trap reservoir. The curves are interpolated from individual points representing each a simulation result. For each oil volume value, there is a specific composition of the set tracers. The composition refers to the mixture of tracers in the trap reservoir after each simulation, and results from the relative concentration of the tracers. As described above, an envelope generation algorithm convolves the concentration relationship with the field measurement to create a single function that maps a predictor index to the volumes of oil accumulated. The predictor index is a derived parameter that takes a unique value at the location of predicted production for the specific field measurement of tracer composition. For example, the predictor index may be the error estimate of measured composition versus each composition resulted from the simulation.

As can be seen in FIG. 7, the curves of each of the tracers C[0]-C[5] have the same general shape, with hydrocarbon production increasing more sharply between 0.4 E and 1.0 E+8 (100 million cubic meters) oil volume and then increasing more slowly between 1.0 E+8 and 2.0 E+8 cubic meters, and tapering off thereafter. For example, the hydrocarbon production of tracer C[0] starts approximately at 45 ppm and increases to 85 ppm by about 2.5 E+8 oil volume.

FIG. 8.1 shows an example of a mapping relationship between hydrocarbon production and an estimated error of the field measurement for each tracer concentration from a suite of tracers (C[0]-C[5]) as presented in Block 613 of FIG. 6.1. In FIG. 8.1 a set of curves are plotted, each representing the error of model prediction versus individual tracers for each of the six (6) tracers monitored. The estimated error is normalized to the entire range of concentration variation for each tracer and represents the calculated deviation from the expected hydrocarbon production for each tracer concentration value as obtained from the field measurement. As presented in FIG. 8.1, each value of estimated error for each tracer concentration corresponds to a value of hydrocarbon production.

FIG. 8.2 shows an example of a filling envelope function as presented in Block 615. The filling envelope function represents the calculated normalized error from the expected hydrocarbon production for the combined effect of all tracer concentrations presented in FIG. 8.1. As presented in FIG. 8.2 and denoted by the arrow, to obtain a production prediction the value of hydrocarbon production is selected to produce the minimum value of error. In FIG. 8.2, a statistic average, for example, can convolve all curves and create a single error estimate curve for each composition. The error estimate function is, in this case, the envelope function and the unique value that reveals the production prediction is the minimum of the envelope function. Alternatively, in one or more embodiments, the envelope function may be constructed not to represent a predictor index with a unique value but a continuous indicator index that reveals the production prediction when interpolated with the field measurement. Such a design is more desirable when there exists have more than one field system with similar configurations but with different field measurement values.

FIG. 9.1 shows example of mapping relationship between tracer concentrations and hydrocarbon production based on a set of tracer compositions (C[0]-C[5]) as presented in Block 622 of FIG. 6.2. In FIG. 9.1, the tracer concentrations, for example, the curves presented in FIG. 7 resulted from the set of simulations, are normalized to the maximum value (resulted from the most efficient source rock in this case) and a new set of normalized concentrations correlations is obtained. Specifically, the tracer concentration is normalized to the entire range of concentration variation for each tracer. As presented in FIG. 9.1, each value of tracer concentration for each tracer corresponds to a value of hydrocarbon production.

FIG. 9.2 shows an example of a filling envelope function as presented in Block 623 and two examples of scaled tracer compositions based on field measurement as presented in Block 626 of FIG. 6.2. The filling envelope function represents a combination of tracer concentrations as presented in FIG. 9.1. In one or more embodiments, by combining the normalized concentration correlations curves (for example, taking an average at each point), a single envelope function is obtained that correlates the normalized tracer concentration to the volume of oil. The production prediction is then obtained by first calculating the normalized concentration of the field measurement composition, and subsequently intercepting the envelope function with the normalized field measurement value. In addition, FIG. 9.2 shows two field measurement points (field measurement 1 and field measurement 2) corresponding to two trap reservoirs and their corresponding prediction value after intercepting the envelope function at different locations. As presented in FIG. 9.2 by the arrows, to obtain a production prediction for each field measurement the value of hydrocarbon production is selected at the point where the scaled tracer compositions match a value on the filling envelope function.

Embodiments disclosed herein may be implemented using virtually any type of computing system, regardless of the platform being used. In some embodiments, one or more of the exploration and production computer system and the surface unit may be computer systems located at a remote location such that controlling and monitoring of the field system is processed away from the field. In some embodiments, the computing system may be implemented on remote or handheld devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

As shown in FIG. 10, the computing system 1000 may include one or more computer processor(s) 1004, non-persistent storage 1002 (e.g., random access memory (RAM), cache memory, or flash memory), one or more persistent storage 1006 (e.g., a hard disk), and numerous other elements and functionalities. The computer processor(s) 1004 may be an integrated circuit for processing instructions. The computing system 1000 may also include one or more input device(s) 1020, such as a touchscreen, keyboard, mouse, microphone, touchpad, electronic pen, or any other type of input device. Further, the computing system 1000 may include one or more output device(s)

1010, such as a screen (e.g., a liquid crystal display (LCD), a plasma display, or touchscreen), a printer, external storage, or any other output device. One or more of the output device(s) may be the same or different from the input device(s). The computing system 1000 may be connected to a network system 1030 (e.g., a local area network (LAN), a wide area network (WAN) such as the Internet, mobile network, or any other type of network) via a network interface connection (not shown).

Further, one or more elements of the aforementioned computing system 1000 may be located at a remote location and be connected to the other elements over the network system 1030. The network system 1030 may be a cloud-based interface performing processing at a remote location from the well site and connected to the other elements over a network. The computing system in FIG. 10 may implement and/or be connected to a data repository. For example, one type of data repository is a database.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method comprising:
  acquiring a plurality of tracer field measurements from a first wellbore regarding a trap reservoir,
    wherein the plurality of tracer field measurements describe a plurality of tracer compositions in reservoir fluid from the trap reservoir, and
    wherein at least one tracer composition is a carbazole tracer and a nitrogen-based compound;
  performing, by a computer processor, a plurality of dynamic simulations using the plurality of tracer field measurements and a plurality of models to produce a plurality of simulated tracer compositions,
    wherein each model among the plurality of models describes a plurality of structural properties of one or more subsurface rocks, and
    wherein the plurality of dynamic simulations describe an accumulation of oil and a migration of the plurality of tracer compositions through one or more subsurface layers to produce the plurality of simulated tracer compositions at the trap reservoir;

calculating, by the computer processor, a production prediction for the trap reservoir based on a filling envelope function and the plurality of simulated tracer compositions, wherein the filling envelope function determines a potential volume of accumulated hydrocarbons based on an average of tracer compositions among the plurality of simulated tracer compositions;

performing, in response to calculating the production prediction at the trap reservoir, a drilling operation using a drill string and a drill bit to produce a second wellbore that traverses the trap reservoir; and extracting hydrocarbons from the trap reservoir using the second wellbore, a pump jack, and a pneumatic piston.

2. The method of claim 1, wherein the plurality of models comprises a base field model that is based on a set of subsurface field properties.

3. The method of claim 1, wherein for each dynamic simulation from the plurality of dynamic simulations, a test value from a suite of test values is selected for an empty parameter in random or predefined order.

4. The method of claim 1, wherein the plurality of dynamic simulations quantify an effect of an environment on each of the plurality of tracer compositions in the trap reservoir.

5. The method of claim 1, further comprising:

extracting the filling envelope function from an estimated error mapping between an amount of hydrocarbon production and the plurality of tracer field measurements.

6. The method of claim 1, further comprising:

presenting the production prediction on a user interface to a user.

7. A system, comprising:

a plurality of tracers trapped in a trap reservoir in a subsurface formation;

a drilling system comprising a drill string and a drill bit; and a computer system comprising a computer processor and a memory, wherein the memory comprises instructions configured to perform a method comprising:

performing a plurality of dynamic simulations using a plurality of tracer field measurements and a plurality of models to produce a plurality of simulated tracer compositions, wherein the plurality of tracer field measurements are acquired from the plurality of tracers in a first wellbore, wherein the plurality of tracer field measurements describe a plurality of tracer compositions in reservoir fluid from the trap reservoir, wherein at least one tracer composition is a carbazole tracer and a nitrogen-based compound wherein each model among the plurality of models describes a plurality of structural properties of one or more subsurface rocks, and wherein the plurality of dynamic simulations describe an accumulation of oil and a migration of the plurality of tracer compositions through one or more subsurface layers to produce the plurality of simulated tracer compositions at the trap reservoir, and calculating a production prediction for the trap reservoir based on a filling envelope function and the plurality of simulated tracer compositions, wherein the filling envelope function determines a potential volume of accumulated hydrocarbons based on an average of tracer compositions among the plurality of simulated tracer compositions, wherein the drilling system is configured to perform, in response to calculating the production prediction at the trap reservoir, a drilling operation using the drill string and the drill bit to produce a second wellbore that traverses the trap reservoir, and wherein the second wellbore is used to extract hydrocarbons from the trap reservoir using a pump jack and a pneumatic piston.

8. The system of claim 7, wherein for each dynamic simulation from the plurality of dynamic simulations, a test value from a suite of test values is selected for an empty parameter in random or predefined order.

9. The system of claim 7, wherein the plurality of dynamic simulations quantify an effect of an environment on each of the plurality of tracer compositions in the trap reservoir.

10. The system of claim 7, further comprising:

a user interface configured to display the production prediction to a user.

* * * * *